United States Patent Office 3,473,572
Patented Oct. 21, 1969

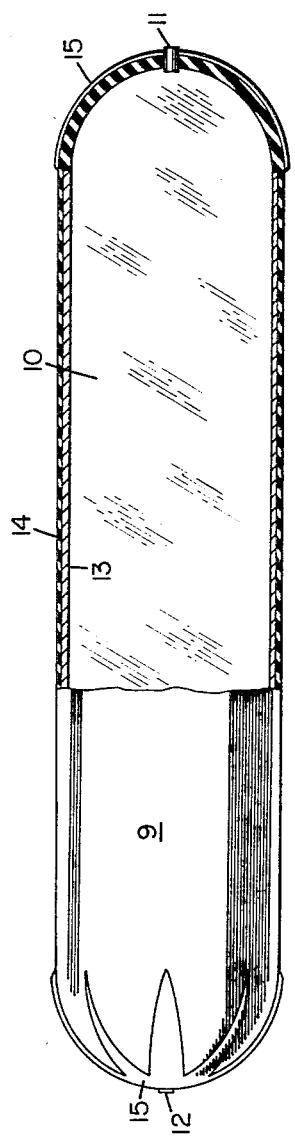

3,473,572
BATCHING PIG AND SEPARATION OF
INTERFACE IN PIPELINE FLOW
Gary I. Nielson, deceased, late of Littleton, Colo., by Eva Nielson Hassell, sole heir, Provo, Utah, and William B. Gogarty, Littleton, Colo., assignors to Marathon Oil Company, Findlay, Ohio, a corporation of Ohio
Filed Apr. 15, 1966, Ser. No. 544,351
The portion of the term of the patent subsequent to Dec. 28, 1982, has been disclaimed
Int. Cl. E03b; E03c; F16k
U.S. Cl. 137—802                3 Claims

ABSTRACT OF THE DISCLOSURE

The present invention comprises an elongated batch-in pig for pipeline usage comprising a highly viscous gel enclosed in a thin walled container conformable to the shape of a particular pipeline in which the pig is to be utilized, wherein the thin walls of the container are tearable by stalactites and other obstructions on the internal surfaces of the pipeline.

---

This invention relates to pipeline pigs and more particularly to pipeline pigs having thin lateral walls.

United States Patent 3,209,771 teaches the use of gelled bodies for separating two fluids in pipelines. This technique is useful but suffers from the fact that some gels tend to break up in long pipelines. United States Patent 3,225,787, issued Dec. 28, 1965 (patent application Ser. No. 179,879), teaches an elongated gel-filled pipeline pig having elastic reinforced rubber sidewalls and thickened ends. The pig of the present invention differs from these prior pigs in that it utilizes thin lateral walls and, preferably, elastic end walls. Such pigs are advantageous, because they flow more freely in pipelines having "stalactites" at welded joints in the line. Pigs having thick walls tend to be blocked by such stalactites and allow dangerous pressures to build up in the pipeline before deforming sufficiently to flow past such obstructions. The pigs of the present invention are simply ripped by the stalactites and flow on without substantial pressure buildup. There is little loss of the contents of the pig due to the highly viscous nature of the gels.

The pipeline pig of this invention is more fully illustrated in the attached drawing which shows a preferred pig partially cut away for illustrative purposes.

The depicted pig 9 is in the form of a closed cylinder. Pig 9 is filled with a gel 10 through valve 11. Air is allowed to escape through valve 12 as gel fills pig 9. Some air can remain in the pig and the skin can be wrinkled during usage. The walls of pig 9 are preferably made up of a cloth 13, such as canvass. A thin rubber coating 14, as is sometimes found in raincoats and the like, is shown overlying the cloth. Ordinarily, the walls of pig 9 need be a maximum thickness of only about $\frac{1}{32}''$ to $\frac{1}{16}''$. Slightly greater thicknesses may be necessary where a fabric of low strength is utilized in making up the pig. A stellate rubber stiffener 15 is vulcanized on both ends of pig 9. Stiffener 15 enables the pig to readily adapt to differences in the diameter of the pipeline; for example, when pig 9 goes from one pipeline to a line of larger diameter.

Gels which can be used in the batching pigs of this invention can be any highly viscous material. Gels having a putty-like consistency are preferred. Suitable gels include both oil- and water-based materials known to the art; for example, a gel made up of 10% of an acrylamide copolymer and 1% aluminum sulfate in water. Alternately, a gel of aluminum octanoate in a hydrocarbon can be utilized.

While a preferred embodiment of this invention is described, other embodiments will be obvious to those skilled in the art.

Examples of such different embodiments include the use of fabrics which are coated on both sides with a sealant material or, alternately, the use of a tightly woven fabric having no sealant coating. Conversely, a thin rubber wall with no cloth reinforcing can be used. Spring steel stiffeners can be slidably sewn into the fabric at the ends of the pig to impart the desired flat shape to the ends of the pig, or a thick round rubber stiffener can be molded to the rubber-coated fabric for the same purpose. Where the pig is to be completely filled and no differences in pipeline diameter are expected, the stiffener element can be eliminated.

Now having described our invention, what we claim is:

1. An elongated batching pig for pipeline usage comprising a highly viscous gel enclosed in a thin walled container conformable to the shape of a particular pipeline in which the pig is to be utilized wherein the thin walls of the container are tearable by stalactites and other obstructions on the internal surfaces of the pipeline.

2. The pig of claim 1 having stiffening means in the ends of said elongate pig, said stiffeners being adapted to increase the conformance of the shape of the pig to the shape of the pipeline.

3. The pig of claim 1 wherein the thin lateral walls have no reinforcing.

References Cited

UNITED STATES PATENTS

| 2,678,666 | 5/1954  | Theis et al.     | 138—93  |
| 2,965,125 | 12/1960 | Osborne et al.   | 137—268 |
| 3,120,859 | 2/1964  | Wakely           | 138—93  |
| 3,225,787 | 12/1965 | Gogarty et al.   | 137—1   |

M. CARY NELSON, Primary Examiner

JOHN R. DWELLE, Assistant Examiner

U.S. Cl. X.R.

15—104.06